United States Patent
Tsujimura et al.

(10) Patent No.: US 6,556,271 B1
(45) Date of Patent: Apr. 29, 2003

(54) LCD HAVING COLOR FILTERS ON TFT SUBSTRATE WHEREIN TRANSPARENT CONDUCTIVE FILM IS PATTERNED USING BACK EXPOSURE WITH UV LIGHT FILTERED TO REMOVE WAVELENGTHS ABOVE 365 NM

(75) Inventors: Takatoshi Tsujimura, Fujisawa (JP); Taro Hasumi, Tokyo (JP)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/571,010

(22) Filed: May 15, 2000

(30) Foreign Application Priority Data

May 14, 1999 (JP) ............................................. 11-133891

(51) Int. Cl.[7] .......................... G02F 1/13; G02F 1/1335
(52) U.S. Cl. ......................... 349/187; 349/106; 349/143
(58) Field of Search ................................ 349/106, 143, 349/187

(56) References Cited

U.S. PATENT DOCUMENTS 5,757,444 A * 5/1998 Takemura .................... 349/38
5,818,550 A * 10/1998 Kadota et al. ................ 349/43

* cited by examiner

Primary Examiner—Robert H. Kim
Assistant Examiner—Andrew Schechter
(74) Attorney, Agent, or Firm—Charles W. Peterson, Jr.; Marian Underweiser; Casey P. August

(57) ABSTRACT

A method of manufacturing a color liquid crystal display element. The method includes the steps of: forming coloring layers composed of a plurality of colors on a transparent substrate on which a thin film transistor structure, a gate line and a data line are formed; forming a transparent conductive film over the entire transparent substrate on which the coloring layers are formed; coating the entire surface of the transparent conductive film with a negative resist; exposing the negative resist to a light using the gate line and the data line as a photomask, the light being emitted from a light source facing a back side of the transparent substrate, the light substantially having wavelength bands excluding 390 nm to 440 nm; developing and baking the exposed negative resist; and etching and removing the transparent conductive film in a portion where the negative resist is removed.

12 Claims, 8 Drawing Sheets

(PRIOR ART)

LCD HAVING COLOR FILTERS ON TFT SUBSTRATE WHEREIN TRANSPARENT CONDUCTIVE FILM IS PATTERNED USING BACK EXPOSURE WITH UV LIGHT FILTERED TO REMOVE WAVELENGTHS ABOVE 365 NM

Background of the Invention

1. Field of the Invention

The present invention relates to a method of manufacturing a liquid crystal display and more particularly to a method of manufacturing a color liquid crystal display having coloring layers on pixel electrode portions.

2. Background Description

As a method of manufacturing a liquid crystal display, the following method is disclosed in Tsujimura et al., "Self Align Patterning Method" in IBM Technical Disclosure Bulletin, RD v41 n409 05-98 article 40991. In this method, a transparent pixel electrode, e.g., an ITO (Indium-Tin-Oxide) electrode is formed on a TFT (Thin Film Transistor) array structure by back side exposure using a negative resist. FIGS. 1a to 1d are diagrammatic cross sectional views of a process of forming the ITO electrode by this known back side exposure method. First, a gate electrode 2 is patterned on a transparent substrate 1 made of glass. A gate insulating film 3, an amorphous silicon (a-Si) film 4 and an etching protective film 5 are deposited. The etching protective film 5 is patterned. An n+a-Si film and source and drain electrode films are deposited. Source and drain electrodes 6 and 7 and a data line 8 are patterned. The n+a-Si film is etched. The structure, in which a thin film transistor (TFT) structure and the data line are formed on the transparent substrate 1 as shown in FIG. 1a, is thus obtained. Then, as shown in FIG. 1b, the structure of FIG. 1a is coated with an interlayer polymer resin and the resin is exposed to a light, developed and baked, whereby an interlayer polymer resin layer 9 is formed. An ITO conductive film 10 is formed over the interlayer polymer resin layer 9. The ITO conductive film 10 is coated with a negative resist 11. Then, the negative resist 11 is exposed to the light from a light source, e.g., an ultra-high pressure mercury lamp from a back side of the transparent substrate 1. In this case, the gate line and the data line 8, which are an opaque metal, are used as a photomask. Then, the negative resist 11 is developed and baked, so that an exposed portion 11' alone of the negative resist 11 remains as shown in FIG. 1c. This portion 11' partially overlaps the gate line and the data line used as the photomask, due to diffraction of light which occurs at the time of the back side exposure. Then, the ITO conductive film 10 is etched by a mixed liquid of nitric acid and hydrochloric acid and thus the negative resist 11' is removed, whereby an ITO electrode 10' is obtained as shown in FIG. 1d.

According to such a back side exposure method, it is possible to equalize an overlap length of the ITO electrode and the data line resulting from the diffraction of light which occurs at the time of the back side exposure. Thus, capacities of the ITO electrode and the data line can be equalized. Thus, deterioration in display quality due to vertical crosstalk does not occur. Moreover, there is no problem of a surface seam resulting from stepper exposure. Thus, a thickness of polymer can be reduced, and therefore the process is facilitated. Furthermore, since the ITO electrode overlaps the data line, a horizontal electric field is not applied to liquid crystal molecules on the ITO electrode. Thus, a discrimination line remains on the data line alone. Therefore, it is not necessary to hide the discrimination line. Consequently, an opening ratio is increased.

When such a back side exposure method is used in a so-called CFA (Color Filter on Array) structure, the method in which pigment-dispersed red, green and blue color resist layers are buried under the polymer resin layer as a coloring layer as shown in FIG. 2a has an advantage in reliability of a panel.

When the back side exposure is performed by using the ultra-high pressure mercury lamp, exposure energy of the negative resist on each color pixel is expressed as the following equation:

$$\text{Dose}_{red} = tM(\lambda)G(\lambda)C_{red}(\lambda)N(\lambda)d\lambda;$$

$$\text{Dose}_{green} = tM(\lambda)G(\lambda)C_{green}(\lambda)N(\lambda)d\lambda;$$

and $$\text{Dose}_{blue} = tM(\lambda)G(\lambda)C_{blue}(\lambda)N(\lambda)d\lambda,$$

where t represents an exposure time, $M(\lambda)$ represents an emission spectrum of the ultra-high pressure mercury lamp, $G(\lambda)$ represents a transmission spectrum of the glass, $C(\lambda)$ represents the transmission spectrum of each color resist, and $N(\lambda)$ represents an absorption spectrum of the negative resist. It is seen that the exposure energy of the negative resist on each pixel depends on the transmission spectrum of each color resist.

FIG. 3 is a graph of a relationship between the transmission spectrum of each color resist and the negative resist and the spectrum of the ultra-high pressure mercury lamp. The ultra-high pressure mercury lamp for typical use as the light source has sharp peaks of an i line (365 nm), a g line (405 nm) and an h line (436 nm). Thus, a shape of each spectrum near each of these lines becomes a problem. As can be seen from this graph, the red, green and blue color resists have substantially the same transmission intensity near the i line. On the other hand, the color resists considerably differ in transmission intensity near the g line and the h line. That is, the transmission intensity of the blue color resist is very high, and the transmission intensity of the red color resist is higher than that of the green color resist. FIG. 4 is a graph of the transmission intensity of each of other various color resists. It is seen from this graph that the transmission intensity differs depending on the color of the color resist.

Transmission properties differ depending on the color of the color resist buried in the pixel. Thus, the overlap of the ITO electrode and the data line resulting from the diffraction of light varies depending on the color of each color resist as shown in FIGS. 2b and 2c. FIG. 5 shows an electron photomicrograph of the pixel electrode formed by the above-described conventional back side exposure method. In this example, the following fact is seen. The negative resist of a green pixel is sufficiently exposed to the light. Thus, the overlap of the ITO electrode and the data line of a blue pixel is greatly increased. A short circuit occurs between adjacent pixels. Thus, a difference in the overlap length of the ITO electrode and the data line depending on the color of the color resist manifests itself in the form of blue crosstalk, for example, and deteriorates the display quality.

The following fact is disclosed in Japanese Patent Publication No. 7-104516. A positive resist is exposed to the light of 400 nm or less, whereby a high-accuracy transparent electrode pattern can be formed on a color filter by self alignment using the color filter as the photomask. The self alignment can be executed by using as the photomask the color filter whose transmittance is about 0 at 400 nm or less as shown in FIG. 3.

OBJECTS OF THE INVENTION

It is an object of the present invention to provide a method of manufacturing a color liquid crystal display capable of equalizing an overlap length of an ITO electrode and a data line regardless of colors of color resists buried in a pixel.

It is another object of the present invention to provide a method of manufacturing a color liquid crystal display capable of equalizing an overlap length of the ITO electrode and a data line regardless of colors of color resists buried in a pixel, while forming the ITO electrode by back side exposure using a negative resist.

SUMMARY OF THE INVENTION

The present invention is a method of manufacturing a color liquid crystal display according to the present invention comprises the steps of: forming coloring layers composed of a plurality of colors on a transparent substrate on which a thin film transistor structure, a gate line and a data line are formed; forming a transparent conductive film over the entire transparent substrate on which the coloring layers are formed; coating the entire surface of the transparent conductive film with a negative resist; exposing the negative resist to a light using the gate line and the data line as a photomask, the light being emitted from a light source facing a back side of the transparent substrate, the light substantially having wavelength bands excluding 390 nm to 440 nm; developing and baking the exposed negative resist; and etching and removing the transparent conductive film in a portion where the negative resist is removed.

BRIEF DESCRIPTION OF THE FIGURES

The foregoing and other objects, aspects, and advantages will be better understood from the following non limiting detailed description of preferred embodiments of the invention with reference to the drawings that include the following.

DESCRIPTION OF A PREFERRED EMBODIMENT OF THE INVENTION

Figure 1:
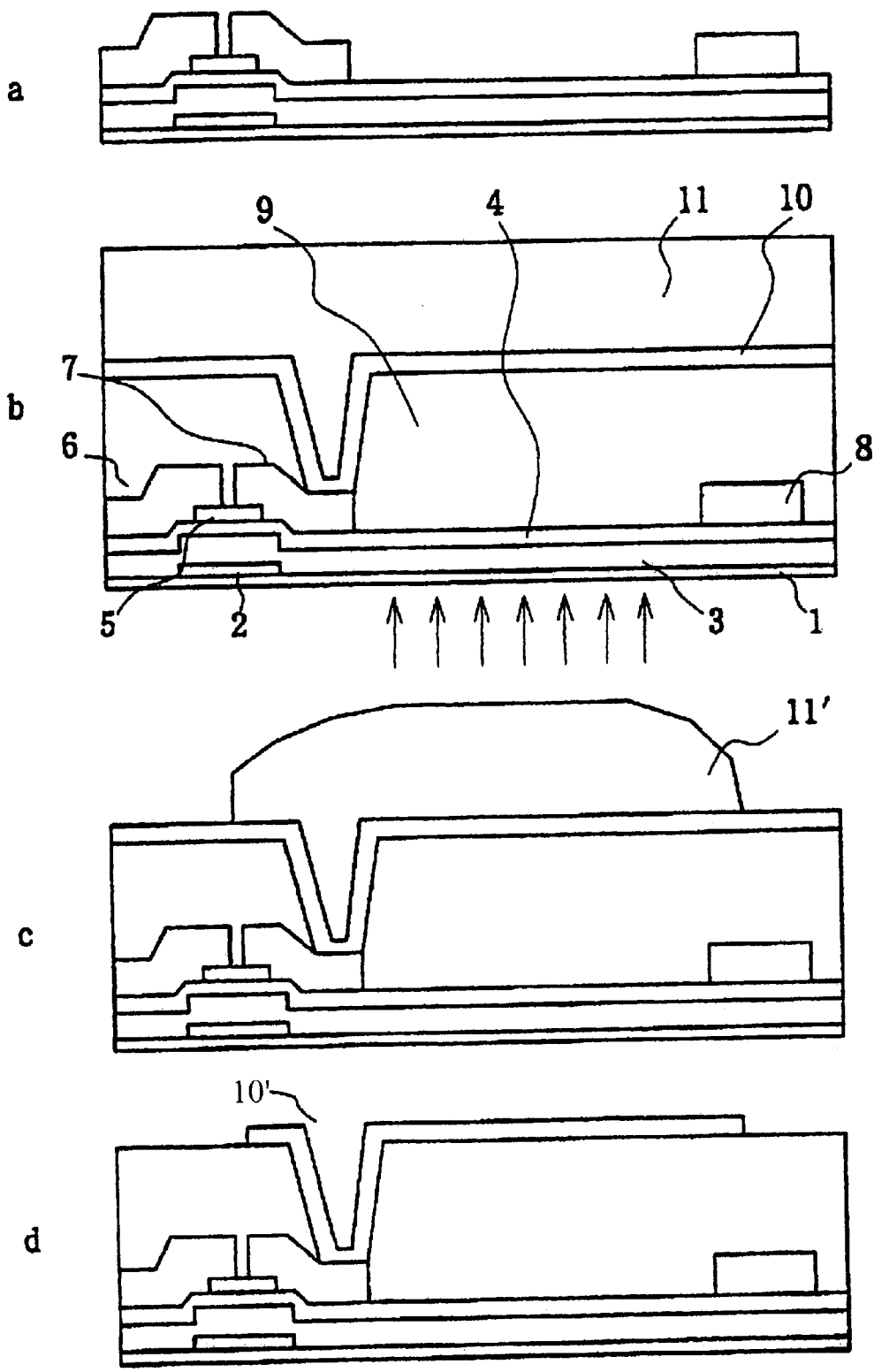
FIGS. 1a to 1d are cross sectional views of a process of forming an ITO electrode by a conventional back side exposure method.
Figure 2:
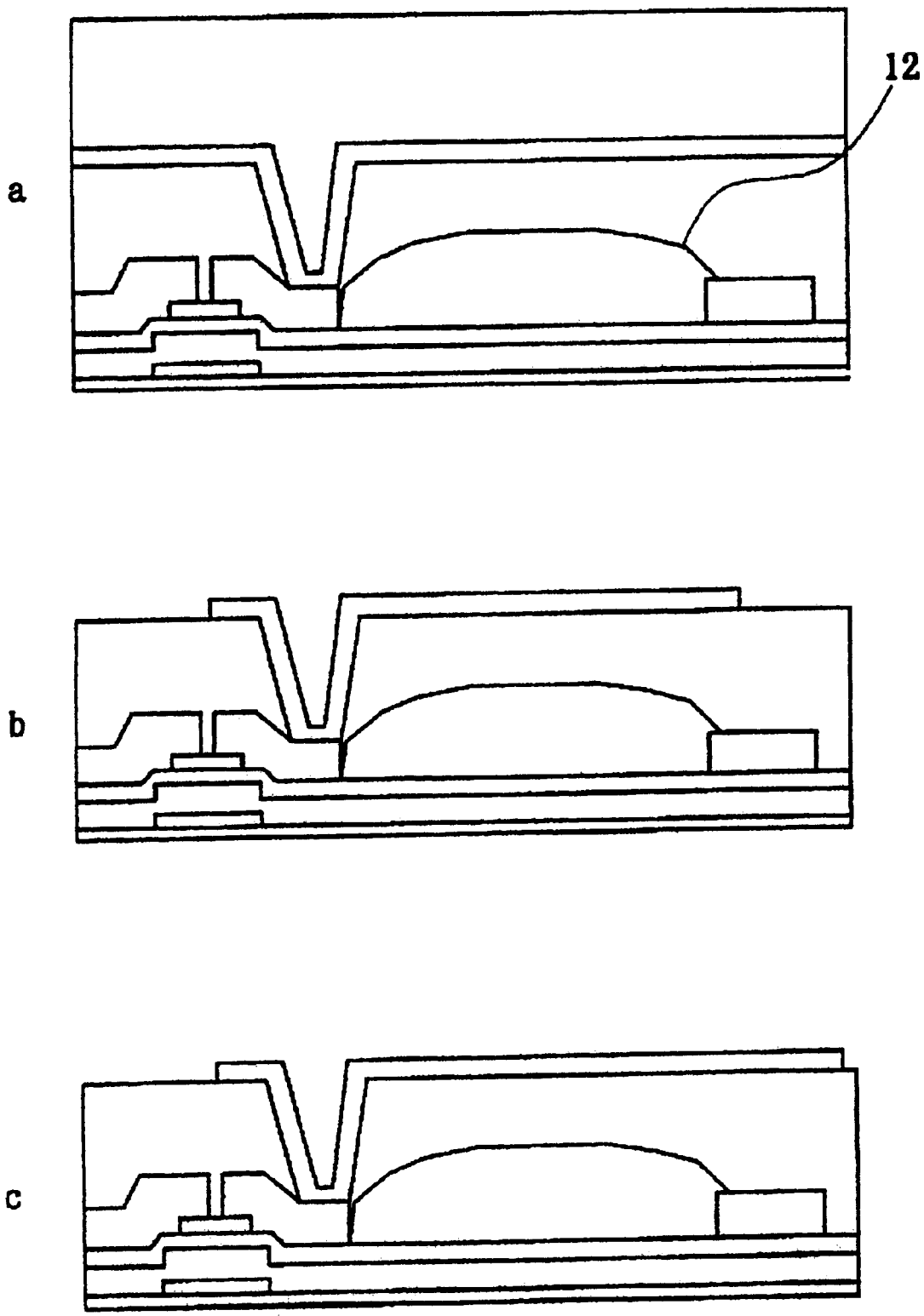
FIGS. 2a to 2c are cross sectional views of the case where the conventional back side exposure method is used in a CFA structure.
Figure 3:
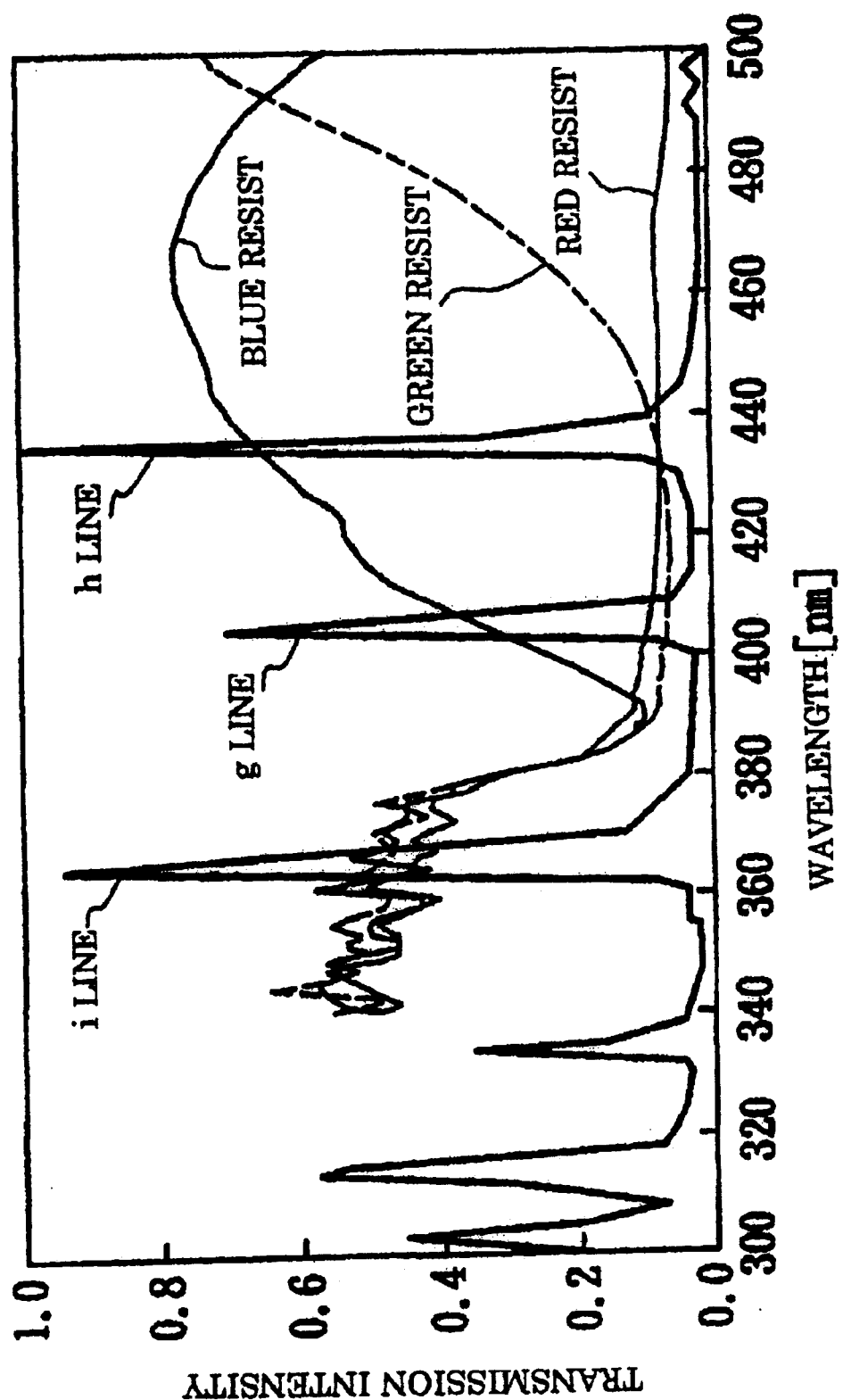
FIG. 3 is a graph of a relationship between a transmission spectrum of each color resist and a negative resist and a spectrum of an ultra-high pressure mercury lamp.
Figure 4:
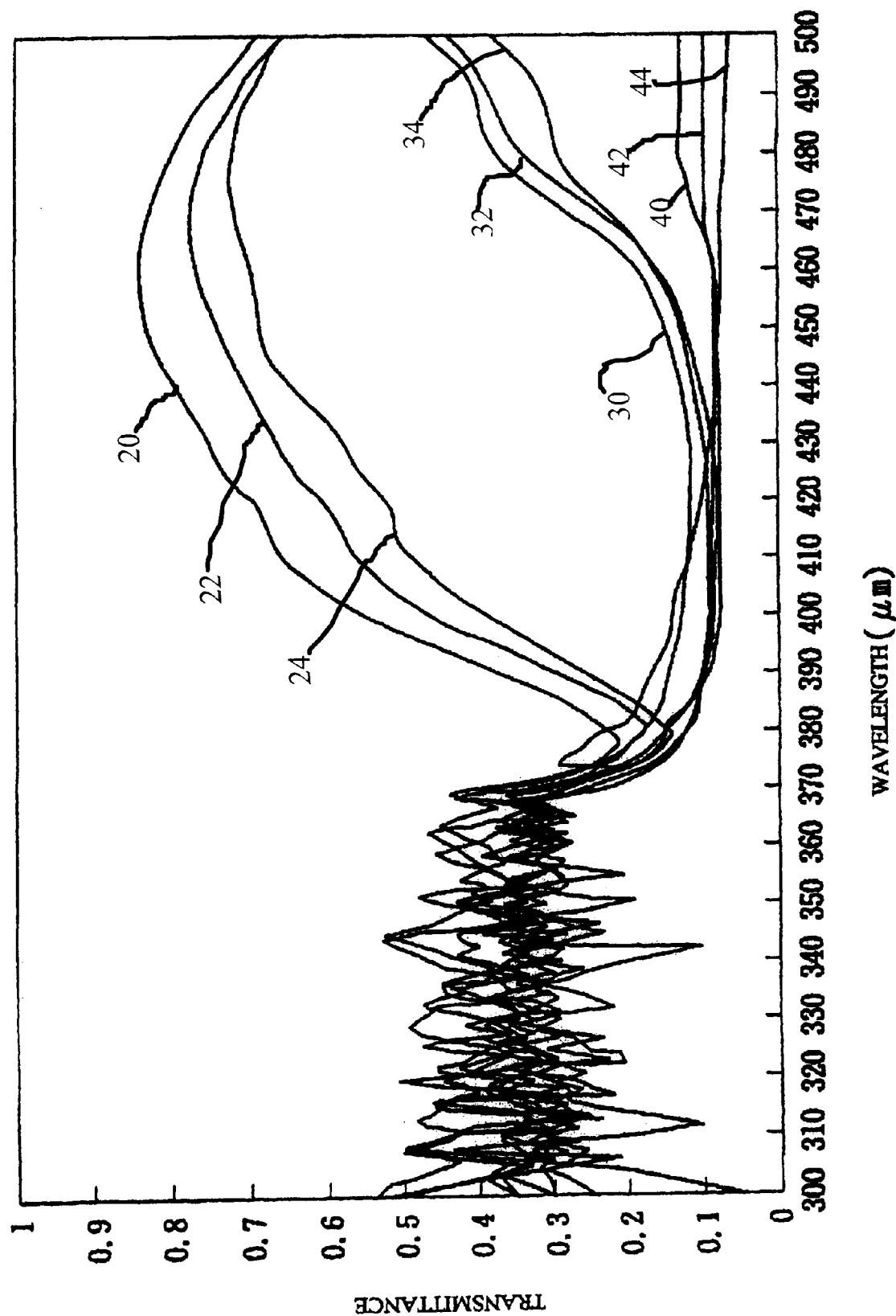
FIG. 4 is a graph of the transmission spectrum of each of various color resists.

As can be seen from FIGS. 3 and 4, in each color resist (e.g., blue resists 20, 22, 24, green resists 30, 32, 34 and red resists 40, 42, 44), an absorption spectrum of 390 nm or less is substantially the same regardless of the color. Thus, if the light of 390 nm to 440 nm including a g line and an h line causing different exposure energies of the negative resists on each color pixel can be blocked, overlap lengths of an ITO electrode and a data line of red, green and blue color pixels should be substantially equal.

In the present invention, the overlap lengths of the ITO electrode and the data line of the red, green and blue color pixels can be made equal by performing back side exposure to the light substantially having wavelength bands excluding 390 nm to 440 nm.

As described above, preferably, pigment-dispersed color resists should be used as the coloring layers. Moreover, the transmittance of the each color resist for the light of wavelength 365 nm should preferably be 15% to 60% inclusive, or more preferably 20% to 50% inclusive. Moreover, a difference between maximum transmittance and minimum transmittance of the each color resist for the light of wavelength 365 nm should preferably be 20% or less, or more preferably 10% or less.

Figure 6:
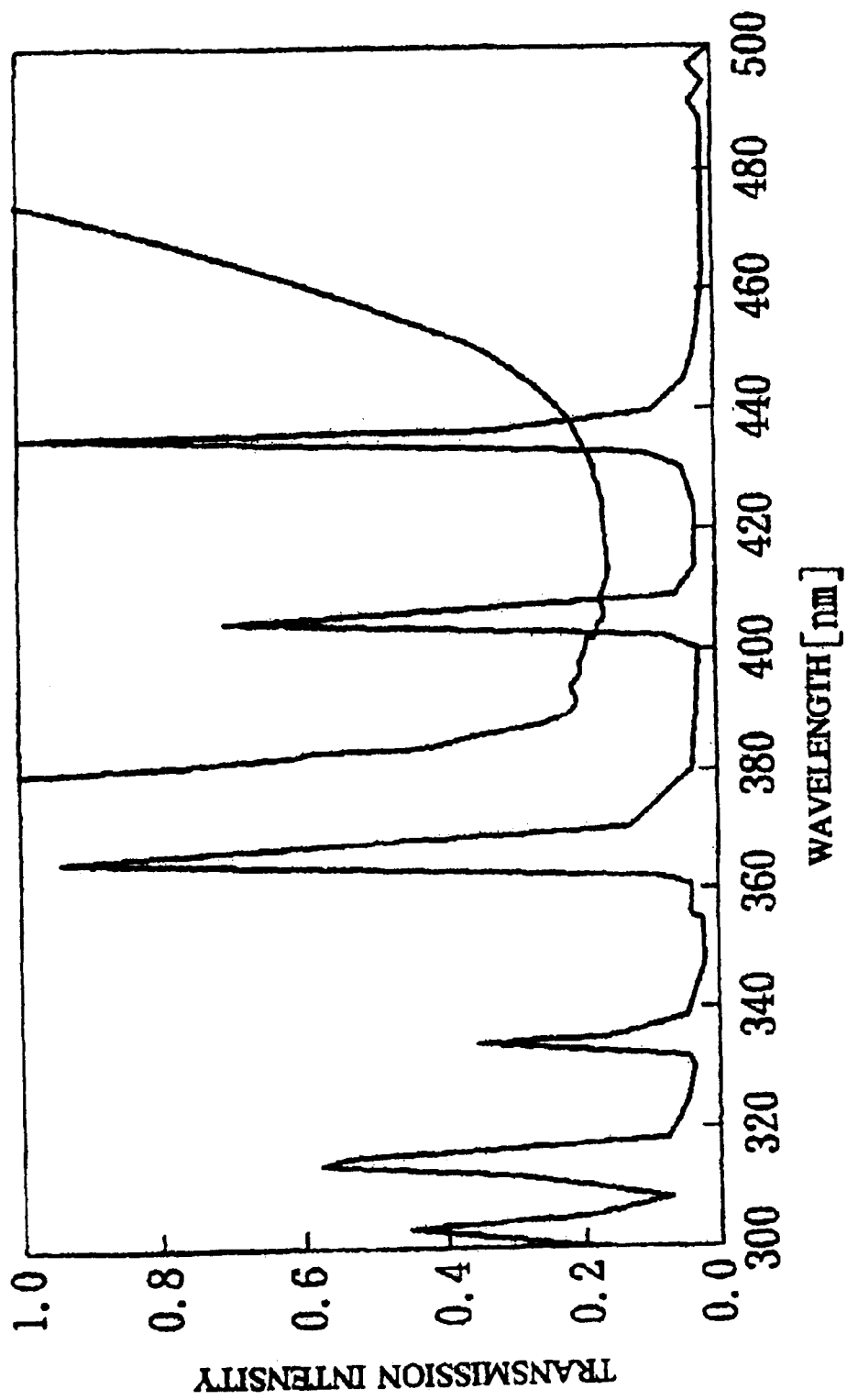
FIG. 6 is a graph of one example of the transmission spectrum of an optical filter for use in the present invention.

An optical filter having absorptance of optical density of 0.7 or more from a light source, i.e., an ultra-high pressure mercury lamp may be used in order to obtain the light substantially having wavelength bands excluding 390 nm to 440 nm. FIG. 6 is a graph of one example of the transmission spectrum of such an optical filter. Moreover, the method may further comprise the step of forming an interlayer polymer resin layer on the transparent substrate on which the coloring layers are formed, after the step of forming a plurality of coloring layers.

Figure 7:
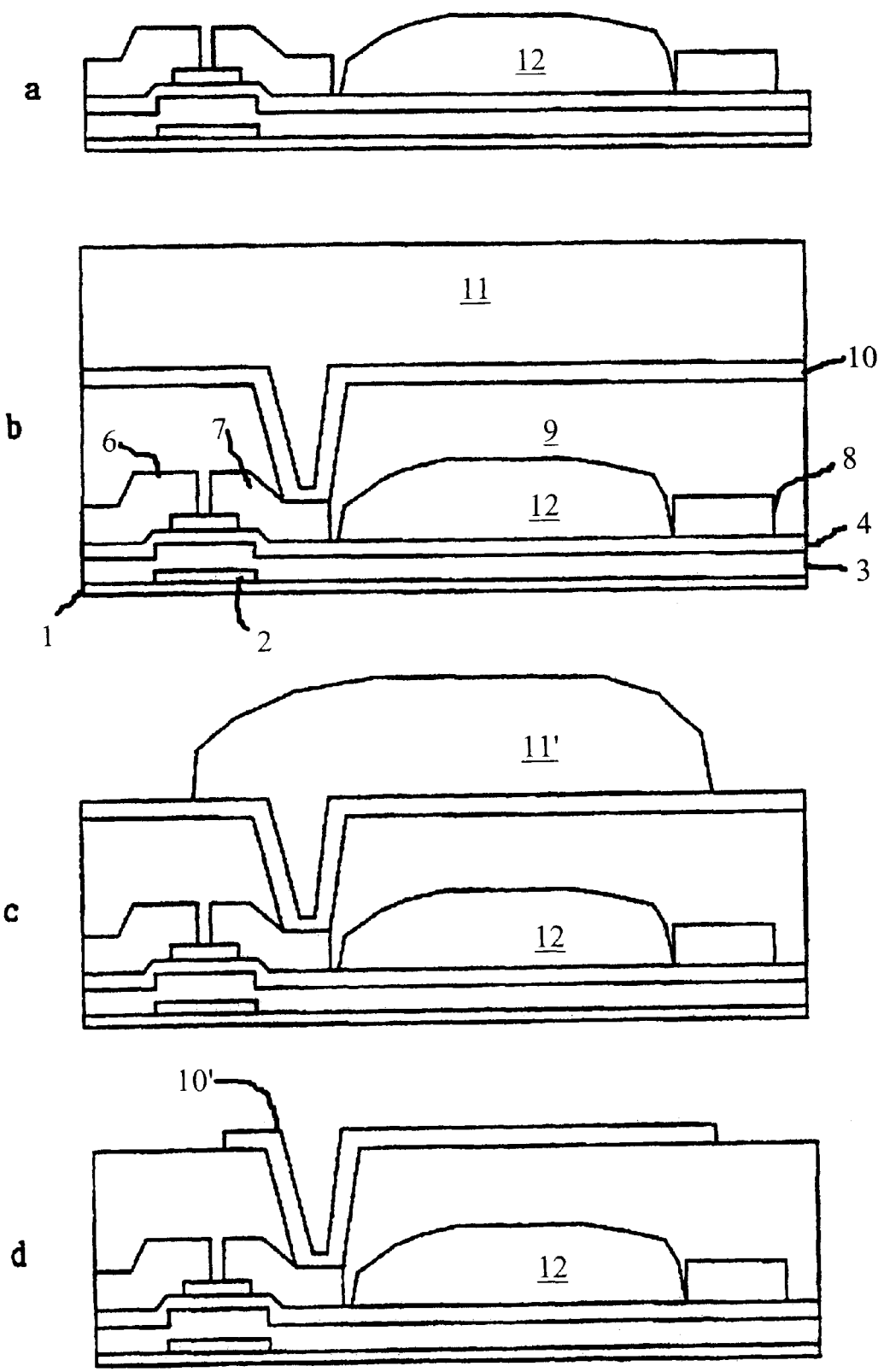
FIGS. 7a to 7d are cross sectional views of a process of one embodiment of a method of manufacturing a color liquid crystal display according to the present invention.

FIGS. 7a to 7d are cross sectional views of a process of one embodiment of a method of manufacturing a color liquid crystal display according to the present invention. The same elements as the elements of FIGS. 1a to 1d are indicated by the same reference numerals. First, a structure, in which a thin film transistor (TFT) structure and a data line are formed on a transparent substrate 1, is obtained in the same manner as the manner described above with reference to FIG. 1a. As shown in FIG. 7a, this structure is coated with pigment-dispersed red, green and blue color resists functioning as a color filter for determining a color of each pixel. The color resists are exposed to a light, developed and baked, whereby a color resist layer 12 is formed.

Then, as shown in FIG. 7b, the structure of FIG. 7a is coated with an interlayer polymer resin and the resin is exposed to the light, developed and baked, whereby an interlayer polymer resin layer 9 is formed. An ITO conductive film 10 of 500 angstroms thick is formed over the interlayer polymer resin layer 9. The ITO conductive film 10 is coated with a negative resist 11 layer of 2 mm thick.

Then, the negative resist layer 11 is exposed to the light having wavelength bands of 390 nm to 440 nm and passing through an optical filter having absorptance of optical density of 0.7 or more from a light source, i.e., an ultra-high pressure mercury lamp from a back side. In this case, a gate electrode 2 and a data line 8, i.e., an opaque metal portion, are used as a photomask. The optical filter for use in this case may be a hexaphthalocyanine complex mixture, a hexaphthalocyanine complex mixture of an acrylic color resist, a copper phthalocyanine green filter, an inorganic pigment i line filter or a thin film interference i line filter. Then, the negative resist 11 is developed and baked, so that an exposed portion 11' alone of the negative resist 11 remains as shown in FIG. 7c. The light passing through the optical filter substantially uniformly passes through the color resist layer 12 regardless of the color of the color resist layer 12. Thus, an-overlap of the negative resist layer 11' and the data line 8 resulting from diffraction of light is also equal regardless of the color of the color resist layer 12.

Then, the ITO conductive film 10 is etched by a mixed liquid of nitric acid and hydrochloric acid and thus the negative resist 11' is removed, whereby an ITO electrode 10' is obtained as shown in FIG. 7d. The overlap of the ITO electrode 10' thus formed and the data line 8 is also equal regardless of the color of the color resist layer 12.

Figure 8:
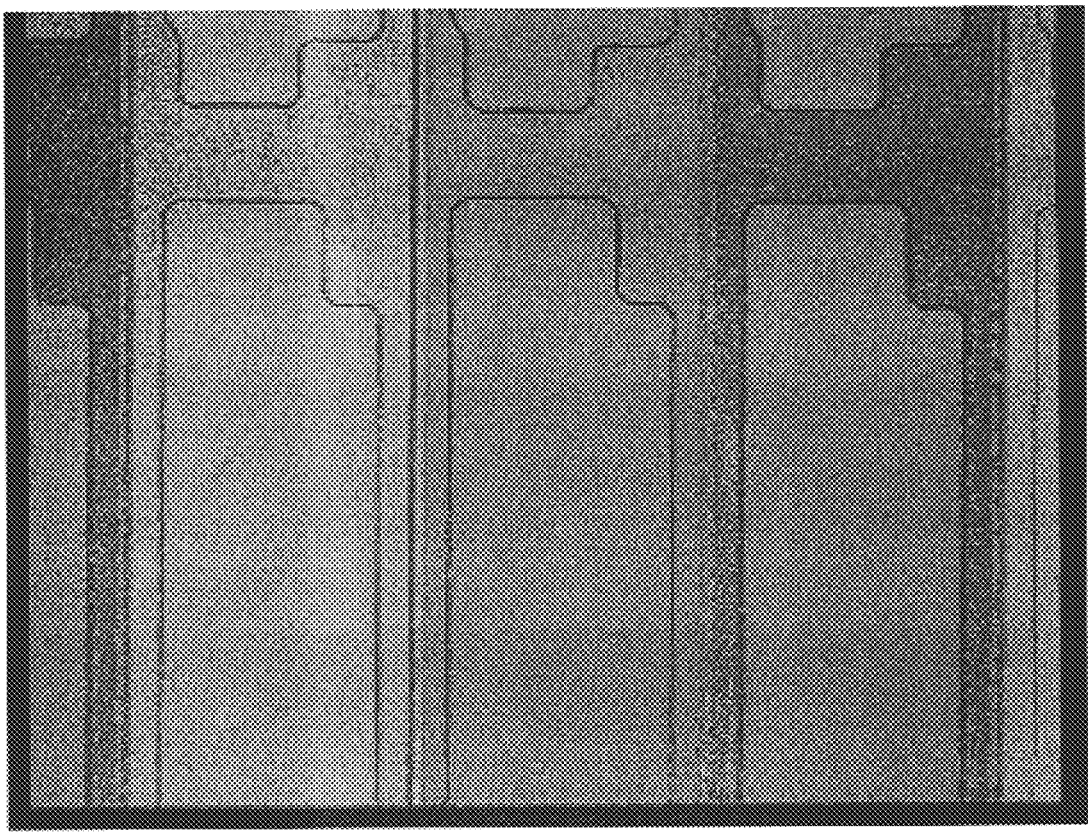
FIG. 8 shows the electron photomicrograph of the pixel electrode formed by the method of manufacturing a color liquid crystal display according to the present invention.

FIG. 8 shows an electron photomicrograph of an experimental example of back side exposure using as the optical filter the copper phthalocyanine green filter having transmission properties shown in FIG. 6. Differently from the electron photomicrograph of FIG. 5, the overlap of the ITO electrode and the data line of each color pixel is equal. Moreover, a short circuit between adjacent pixels shown in FIG. 5 is not observed.

Figure 5:
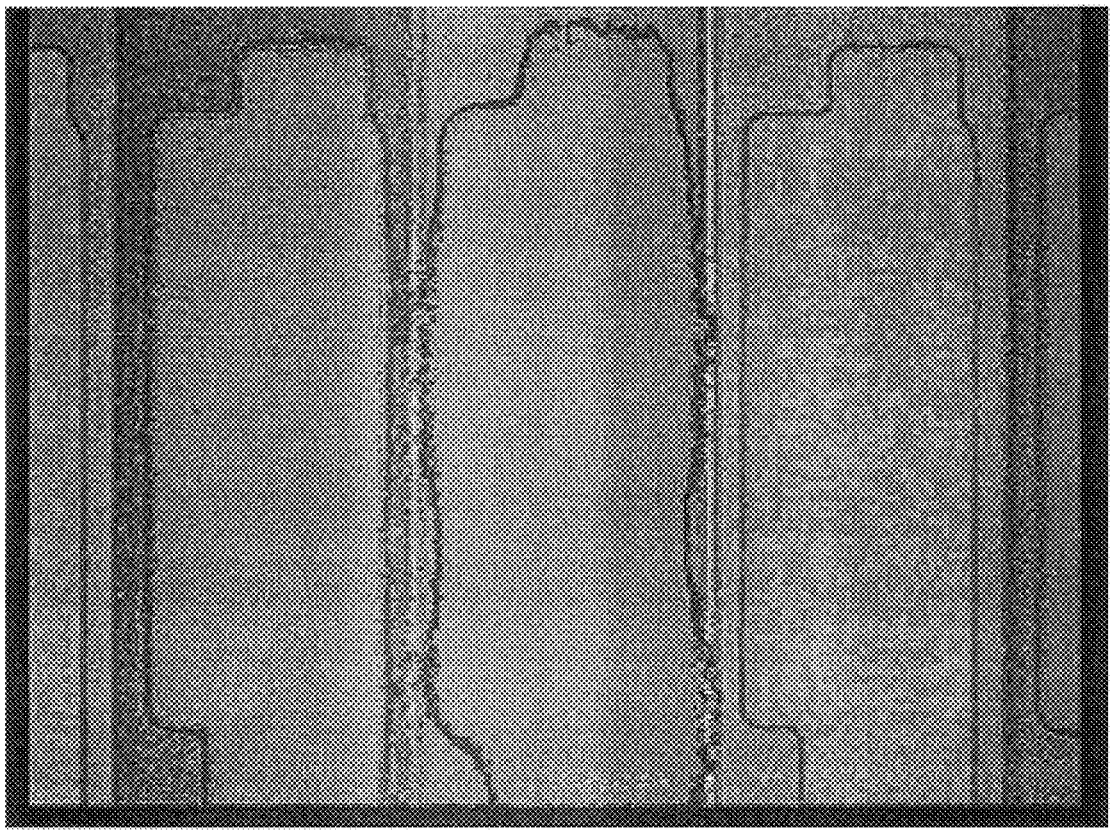
FIG. 5 shows an electron photomicrograph of a pixel electrode formed by the conventional back side exposure method.

In the experiment of FIG. 5, the respective overlap lengths of the ITO electrode and the data line of red, green and blue color pixels were 2.557 mm, 1.105 mm and 12.186 mm. In the experiment of FIG. 8, the respective overlap lengths of the ITO electrode and the data line of red, green and blue color pixels were 1.610 mm, 1.129 mm and 1.989 mm, namely, the overlap lengths were greatly improved. The same effect was obtained by a commercially available inorganic pigment optical filter or thin film interference optical filter having the effect of blocking the light of 360 nm to 440 nm.

ADVANTAGES OF THE INVENTION

According to the present invention, in a CFA structure, while the ITO electrode is formed by the back side exposure using the negative resist, the overlap length of the ITO electrode and the data line can be made equal regardless of the color of the color resist buried in the pixel. According to design simulation, to form the ITO electrode in the CFA structure by a typical stepper, it is necessary to form the interlayer polymer layer of 7 mm or more thick between the data line and the ITO electrode in order not to make an exposed surface seam noticeable. Thus, the process is, in fact, impossible. On the other hand, for the method of manufacturing a color liquid crystal display of the present invention, the interlayer polymer layer of about 2 mm thick may be formed. Thus, the process is possible.

While the invention has been described in terms of preferred embodiments, those skilled in the art will recognize that the invention can be practiced with modification within the spirit and scope of the appended claims.

REFERENCE NUMERALS 1 transparent substrate,
2 gate electrode,
3 gate insulating film,
4 amorphous silicon layer,
5 etching protective film,
6 drain electrode,
7 source electrode,
8 data line,
9 interlayer polymer resin layer,
10 ITO conductive film,
10' ITO electrode,
11, 11' negative resist layer,
12 color resist layer.

We claim:

1. A method of manufacturing a color liquid crystal display comprising the steps of:

forming coloring layers composed of a plurality of colors on a transparent substrate on which a thin film transistor structure, a gate line and a data line are formed;

forming a transparent conductive film over an entire said transparent substrate on which said coloring layers are formed;

coating the entire surface of said transparent conductive film with a negative resist;

exposing said negative resist to a light using said gate line and said data line as a photomask, said light being emitted from a light source facing a back side of said transparent substrate, said light substantially having wavelength bands excluding 390 nm to 440 nm;

developing and baking said exposed negative resist; and etching and removing said transparent conductive film in a portion where said negative resist is removed.

2. The method according to claim 1, wherein said coloring layer comprises a plurality of colors in a pigment-dispersed color resist layer.

3. The method according to claim 2, wherein the transmittance of each color in said color resist layer for the light of wavelength 365 nm is 15% to 60% inclusive.

4. The method according to claim 2, wherein the transmittance of each color in said color resist layer for the light of wavelength 365 nm is 20% to 50% inclusive.

5. The method according to claim 2, wherein a transmittance difference between maximum transmittance and minimum transmittance of each color in said color resist layer is 20% or less for light of wavelength 365 nm.

6. The method according to claim 2, wherein a transmittance difference between maximum transmittance and minimum transmittance of each color in said color resist layer is 10% or less for light of wavelength 365 nm.

7. The method according to claim 1, wherein said light substantially having wavelength bands excluding 390 nm to 440 nm is made by allowing the light from said light source to pass through an optical filter for substantially absorbing the light of wavelength bands of 390 nm to 440 nm.

8. The method according to claim 1, further comprising the step of:

forming an interlayer polymer resin layer on said transparent substrate on which said coloring layers are formed, after said step of forming said plurality of coloring layers.

9. The method according to claim 2, wherein said light substantially having wavelength bands excluding 390 nm to 440 nm is made by allowing the light from said light source to pass through an optical filter for substantially absorbing the light of wavelength bands of 390 nm to 440 nm.

10. The method according to claim 9, further comprising the step of:

forming an interlayer polymer resin layer on said transparent substrate on which said coloring layers are formed, after said step of forming said plurality of coloring layers.

11. The method according to claim 6, wherein said light substantially having wavelength bands excluding 390 nm to 440 nm is made by allowing the light from said light source to pass through an optical filter for substantially absorbing the light of wavelength bands of 390 nm to 440 nm.

12. The method according to claim 11, further comprising the step of:

forming an interlayer polymer resin layer on said transparent substrate on which said coloring layers are formed, after said step of forming said plurality of coloring layers.

* * * * *